US009479282B2

(12) United States Patent
Jinno et al.

(10) Patent No.: US 9,479,282 B2
(45) Date of Patent: Oct. 25, 2016

(54) OPTICAL COMMUNICATION APPARATUS, OPTICAL ROUTE SWITCHING APPARATUS AND NETWORK

(75) Inventors: Masahiko Jinno, Yokosuka (JP); Hidehiko Takara, Yokosuka (JP); Kazushige Yonenaga, Yokosuka (JP); Akira Hirano, Yokosuka (JP); Yoshiaki Sone, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 25 days.

(21) Appl. No.: 14/009,264

(22) PCT Filed: Apr. 26, 2012

(86) PCT No.: PCT/JP2012/061285
§ 371 (c)(1),
(2), (4) Date: Oct. 1, 2013

(87) PCT Pub. No.: WO2012/147889
PCT Pub. Date: Nov. 1, 2012

(65) Prior Publication Data
US 2014/0270776 A1   Sep. 18, 2014

(30) Foreign Application Priority Data

Apr. 27, 2011   (JP) .................................. 2011-099830

(51) Int. Cl.
*H04J 14/02*   (2006.01)
*H04B 10/40*   (2013.01)
(Continued)

(52) U.S. Cl.
CPC ........ *H04J 14/0238* (2013.01); *H04J 14/0204* (2013.01); *H04J 14/0209* (2013.01);
(Continued)

(58) Field of Classification Search
CPC ............. H04J 14/0238; H04J 14/0204; H04J 14/0209; H04J 14/0212; H04J 14/0213; H04J 14/0217; H04Q 11/0067; H04Q 2011/0086; H04L 27/2697
USPC .............................. 398/69, 79–97, 135–139
See application file for complete search history.

(56) References Cited

U.S. PATENT DOCUMENTS 6,288,811 B1 * 9/2001 Jiang et al. ..................... 398/79
6,532,320 B1 * 3/2003 Kikuchi et al. ................ 385/24
(Continued)

FOREIGN PATENT DOCUMENTS

JP    63 59227    3/1988
JP    11 27231    1/1999
(Continued)

OTHER PUBLICATIONS

Jinno et al, Introducing Elasticity and Adaptation Into the Optical Domain Toward More Efficient and Scalable Optical Transport Networks, Dec. 2010, IEEE, pp. 1-7.*
(Continued)

*Primary Examiner* — Ken N Vanderpuye
*Assistant Examiner* — Dibson Sanchez
(74) *Attorney, Agent, or Firm* — Oblon, McClelland, Maier & Neustadt, L.L.P.

(57) ABSTRACT

An optical communication apparatus, in the sending side, distributes client signals according to destinations and a communication capacity of each destination, electrical-to-optical converts the distributed signals to optical signals having different center frequencies, and multiplexes the optical signals to output, and in the receiving side, the optical communication apparatus divides the wavelength division multiplexed signal to each wavelength (for each sending source), optical-to-electrical converts the divided optical signals to electrical signals, and multiplexes the electrical signals to output. An add/drop port of an optical route switching apparatus includes an input/output port to the optical communication apparatus, and an optical frequency bandwidth is variable according to an optical spectrum width of the optical signal. A network is constructed by using the optical communication apparatus and the optical route switching apparatus.

6 Claims, 9 Drawing Sheets

(51) Int. Cl.
*H04Q 11/00* (2006.01)
*H04L 27/26* (2006.01)

(52) U.S. Cl.
CPC ........ *H04J 14/0212* (2013.01); *H04J 14/0213* (2013.01); *H04J 14/0217* (2013.01); *H04Q 11/0067* (2013.01); *H04L 27/2697* (2013.01); *H04Q 2011/0086* (2013.01)

(56) References Cited

U.S. PATENT DOCUMENTS

| | | | |
|---|---|---|---|
| 7,292,784 B2* | 11/2007 | Lee et al. .................... | 398/49 |
| 8,693,880 B2* | 4/2014 | Sakauchi et al. ............. | 398/140 |
| 8,909,043 B2* | 12/2014 | Patel .................... | H04J 14/0212 370/238 |
| 2001/0024427 A1* | 9/2001 | Suzuki ................ | H04W 72/085 370/329 |
| 2003/0096579 A1* | 5/2003 | Ito ....................... | H04L 27/2608 455/67.11 |
| 2004/0141746 A1* | 7/2004 | Oberg ............................ | 398/59 |
| 2005/0063298 A1* | 3/2005 | Ling ........................ | H04L 5/005 370/208 |
| 2005/0185959 A1* | 8/2005 | Kinoshita et al. ............. | 398/59 |
| 2006/0013584 A1* | 1/2006 | Miyazaki ........................ | 398/19 |
| 2006/0188258 A1* | 8/2006 | Gumaste et al. .............. | 398/59 |
| 2006/0210274 A1* | 9/2006 | Lichtman et al. ............. | 398/83 |
| 2006/0212074 A1* | 9/2006 | Umezu et al. ................. | 607/1 |
| 2007/0268900 A1* | 11/2007 | Park ....................... | H04L 12/189 370/390 |
| 2008/0181605 A1* | 7/2008 | Palacharla et al. ............. | 398/50 |
| 2009/0186645 A1* | 7/2009 | Jaturong ................ | H04L 5/0007 455/507 |
| 2009/0196602 A1* | 8/2009 | Saunders ........... | H04B 10/5053 398/26 |
| 2010/0054750 A1* | 3/2010 | Forgheri et al. .............. | 398/136 |
| 2010/0209106 A1 | 8/2010 | Sugawara | |
| 2010/0239259 A1* | 9/2010 | Forghieri ................ | H04J 14/007 398/79 |
| 2011/0164620 A1* | 7/2011 | Jinno et al. .................... | 370/392 |
| 2011/0164623 A1* | 7/2011 | Huang .................... | H04L 5/003 370/474 |
| 2012/0201541 A1* | 8/2012 | Patel et al. ...................... | 398/58 |
| 2012/0213517 A1* | 8/2012 | Ji et al. ........................... | 398/48 |
| 2012/0224851 A1* | 9/2012 | Takara et al. ................... | 398/45 |
| 2012/0251117 A1* | 10/2012 | Patel et al. ...................... | 398/79 |

FOREIGN PATENT DOCUMENTS

| | | |
|---|---|---|
| JP | 2009 10679 | 1/2009 |
| JP | 2010 193184 | 9/2010 |
| WO | 2010 032844 | 3/2010 |
| WO | 2011 030897 | 3/2011 |

OTHER PUBLICATIONS

Jinno et al, Demonstration of novel spectrum efficient elastic optical path network with per-channel variable capacity of 40 Gbs to over 400 Gbs, Sep. 2008, IEEE, pp. 1-2.*

Jinno et al, Management and Control Aspects of Spectrum Sliced Elastic Optical Path Network (SLICE), Sep. 2010, ECOC, pages All Document.*

Jinno et al, Distance Adaptive Spectrum Resource Allocation in Spectrum Sliced Elastic Optical Path Network, Aug. 2010, IEEE, pp. 138-145.*

Jinno et al, Virtualized Optical Network (VON) for Future Internet and Applications, Mar. 2011, IEICE, pp. 470-477.*

Zheng et al, On the Spectrum Efficiency of Bandwidth Variable Optical OFDM Transport Networks, Mar. 2010, OSA, pp. 1-3.*

Jinno, M. et al., "Spectrum-Efficient and Scalable Elastic Optical Path Network: Architecture, Benefits, and Enabling Technologies", IEEE Communications Magazine, vol. 47, No. 11, pp. 66 to 73, (Nov. 2009).

Jinno, M. et al., "Dynamic and Bandwidth-Scalable Optical Network Architecture and Its Supporting Technologies", IEICE, vol. J93-B, No. 3, pp. 403 to 411, (2010) (with partial English translation).

Baxter, G. et al., "Highly Programmable Wavelength Selective Switch Based on Liquid Crystal on Silicon Switching Elements", Proc. OFC/NFOEC 2006, OTuF2, Total pp. 3, (2006).

Gringeri, S. et al., "Flexible Architectures for Optical Transport Nodes and Networks", IEEE Communications Magazine, vol. 48, Issue 7, pp. 40 to 50, (2010).

International Search Report Issued Jun. 5, 2012 in PCT/JP12/61285 Filed Apr. 26, 2012.

* cited by examiner

OPTICAL COMMUNICATION APPARATUS, OPTICAL ROUTE SWITCHING APPARATUS AND NETWORK

TECHNICAL FIELD

The present invention relates to an optical communication apparatus that includes a function for converting a client signal of a client communication apparatus such as a router into an optical signal suitable for transferring over an optical network, and for converting a received optical signal into a client signal, relates to an optical route switching apparatus including the optical communication apparatus and relates to a network including these apparatuses and a client communication apparatus. Especially, the present invention relates to an optical communication apparatus including a unit configured to distribute a client signal according to a destination and a communication capacity for each destination, and to convert the client signals to a plurality of optical signals having different center optical frequencies, and relates to an optical route switching apparatus including the optical communication apparatus and the network.

BACKGROUND ART

A wavelength division multiplexing network has started to be commercially introduced, in which a wavelength division multiplexing transmission technique in an optical fiber transmission technique is utilized, and a wavelength of an optical signal is associated with a send and receive node pair, so as to realize optical communications of multiple-points to multiple-points. As to such an optical wavelength division multiplexing network, a ring-shaped or meshed optical wavelength division multiplexing network is constructed by connecting optical route switching apparatuses called ROADM (Reconfigurable Optical Add Drop Multiplexer) or WXC (Wavelength Cross-connect) using optical fibers. A client signal of a client communication apparatus such as a router is connected to an optical route switching apparatus via an optical communication apparatus called optical transponder, the optical transponder having a function for converting a client signal to an optical signal suitable for transferring over the optical network, and for converting a received optical signal into a client signal. The optical route switching apparatus performs a series of processes such as wavelength division demultiplexing of wavelength division multiplexed optical signals, editing of the optical signals for each destination, and wavelength division multiplexing of the optical signals, so as to realize optical communications between arbitrary client communication apparatuses connected to the optical wavelength division multiplexing network. The optical signal in the optical wavelength division multiplexing network that is currently commercially introduced is placed on frequency grids defined in ITU-T, in which the interval between center frequencies of adjacent optical signals is constant, e.g., 100 GHz.

On the other hand, an elastic optical path network has been proposed for appropriately adjusting the center frequency interval between adjacent optical signals according to requirements of individual optical signals in order to accommodate, more efficiently, optical signals of different bands and optical signals of different transmission distances from the viewpoint of frequency use efficiency (for example, refer to patent documents 1 and 2, and non-patent documents 1 and 2).

RELATED ART DOCUMENT

[Patent document 1] WO2010/032844 "Bandwidth variable communication apparatus and bandwidth variable communication method"

[Patent document 2] WO2011/030897 "Bandwidth variable communication method, bandwidth variable communication apparatus, transmission band determination apparatus, transmission band determination method, node apparatus, communication route setting system, and communication route setting method"

[Non-Patent document 1] Masahiko Jinno, Hidehiko Takara, Bartlomiej Kozicki "Dynamic and bandwidth-scalable optical network architecture and its supporting technologies", IEICE, Vol. J93-B No. 3, pp. 403-411, 2010.

[Non-Patent document 2] M. Jinno, H. Takara, B. Kozicki, Y. Tsukishima, Y. Sone, and S. Matsuoka, "Spectrum-Efficient and Scalable Elastic Optical Path Network: Architecture, Benefits, and Enabling Technologies," IEEE Commun. Mag., Vol. 47, Issue 11, pp. 66-73, 2009.

SUMMARY OF THE INVENTION

Problem to be Solved by the Invention

Figure 1:
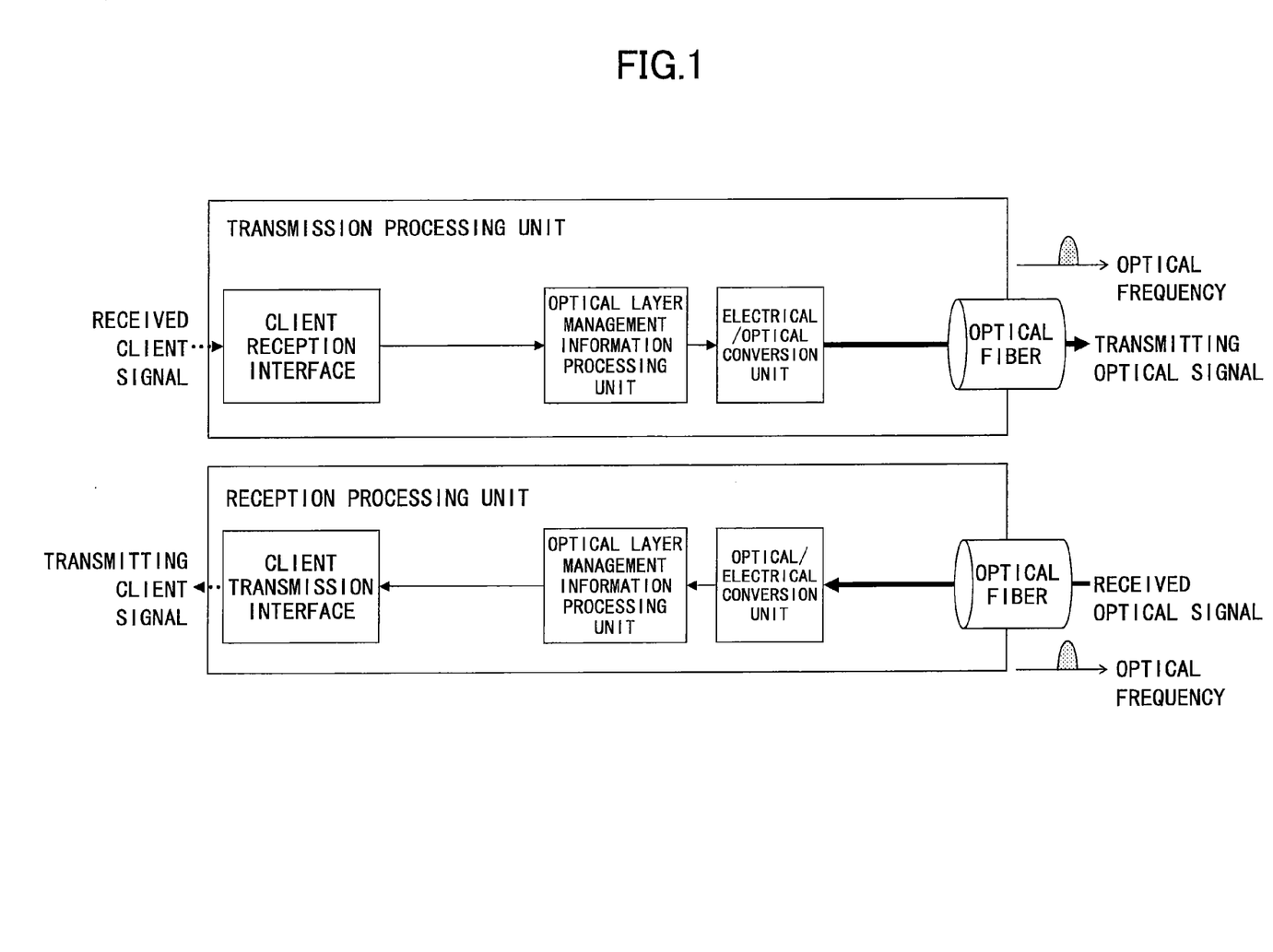
FIG. 1 is a block diagram of basic functions of a conventional optical communication apparatus.
Figure 2:
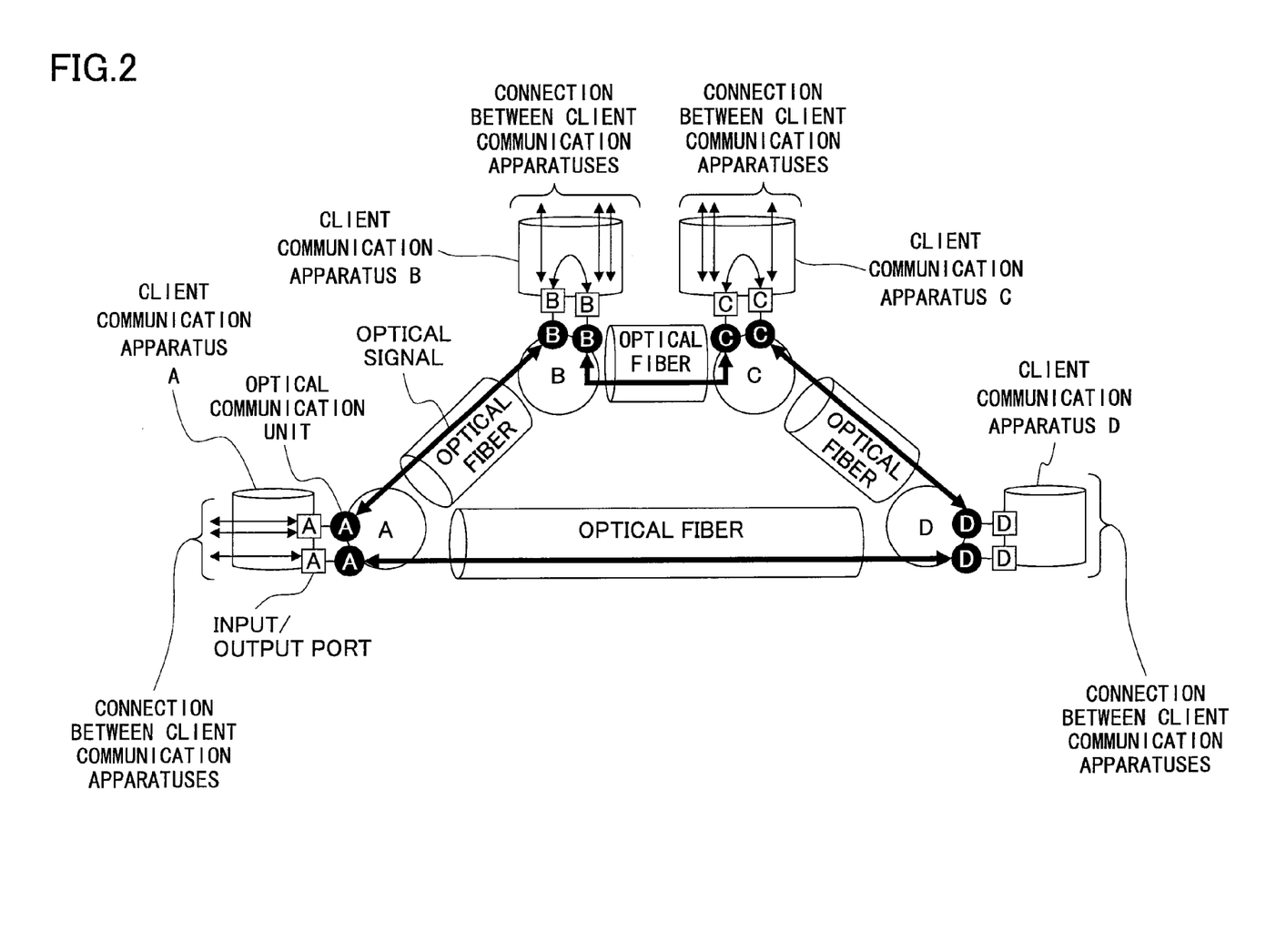
FIG. 2 is a diagram showing an example of a conventional router network.

Irrespective of whether the frequency interval of the adjacent optical signals is constant or variable, in the optical wavelength division multiplexing network, as to the network-side interface of the optical communication apparatus, as shown in the basic block example of the conventional optical communication apparatus of FIG. 1, a transmission processing unit includes a client receiving interface, an optical layer management information processing unit, and an electrical/optical conversion unit. Also, a reception processing unit includes an optical/electrical conversion unit, an optical layer management information processing unit, and a client transmission interface, in which only a single optical signal is input and output. FIG. 2 shows an example of a conventional router network. The optical wavelength division multiplexing network that is the router network shown in FIG. 2 adopts a mechanism in which one optical frequency (wavelength) is assigned for a section of two points between which communication is performed, and an optical signal is transferred along a route that is designed beforehand by using the optical frequency as a label. Thus, the fact that a network side interface of an optical communication apparatus that accommodates a client signal and that is a start point of optical communication sends and receives only a single optical signal means that client communication apparatuses connected to an optical network are connected between two points in a point-to-point manner.

Figure 3:
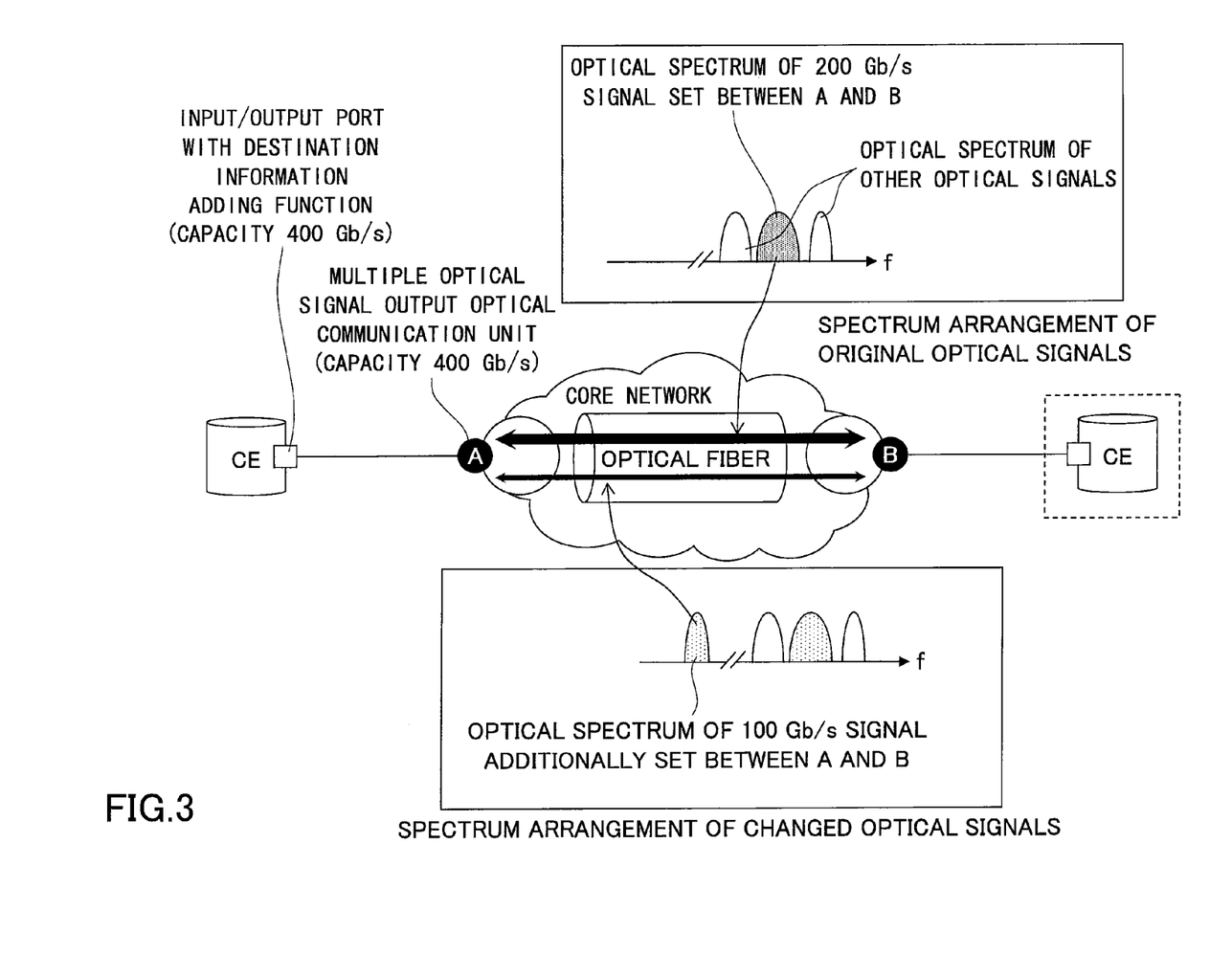
FIG. 3 is a diagram showing a conventional problem.

First, a problem caused due to the fact that the conventional optical communication apparatus inputs and outputs only a single optical signal is described. As described in the non-patent document 1, an optical communication apparatus which can adaptively increase optical transmission capacity according to increase of communication demands of client communication apparatus is being studied and developed. In a system in which such an optical communication apparatus increases occupying optical spectrum width according to increase of transmission capacity (increasing bit rate of 1 wavelength or increasing the number of subcarriers), as shown in FIG. 3, when adjacent optical spectrums are occupied, the optical frequency needs to be changed and service interruption occurs at that time. There is no problem if there is a free space in the optical spectrum adjacent to the optical signal when the communication demand of the client communication apparatus increases. However, in a case where the adjacent optical spectrum is occupied by other optical signals, the transmission capacity cannot be increased unless the optical frequency of the other optical signal is changed. Generally, when the optical frequency of an optical signal is changed, service interruption occurs and deterioration of service quality cannot be avoided.

Next, a network problem is described caused due to the fact that the connection between client communication apparatuses is point-to-point connection.

Generally, client communication apparatuses such as routers are placed at a plurality of sites, and provide communications between the sites. In a case where the client communication apparatuses are connected in a full-mesh manner by the optical signals of the point-to-point connections, the number of ports of client communication apparatuses and the number of optical transponders increase with the square of the number of client communication apparatuses, which drives up the equipment investment cost and maintenance cost. Thus, in the conventional router network and the like shown in FIG. 2, the port of the client communication apparatus and the optical transponder are shared by a plurality of connections between client communication apparatuses, and the routes of the connections between client communication apparatuses are distributed at a relay client communication apparatus, so as to avoid this problem. However, due to increase of data communication amount, processing load for distributing routes in the relay client communication apparatus increases, so that there is widespread concern that future data communication demands cannot be accommodated by a realistic apparatus size, consumed power and apparatus cost.

The present invention is contrived in view of the above-mentioned problem, and an object of the present invention is to provide an optical communication apparatus, an optical route switching apparatus and a network for realizing smooth change of transmission capacity of an optical communication apparatus, and to realize communication with a plurality of client communication apparatuses via one port of the client communication apparatus without increase of load of the relay client communication apparatus.

Means for Solving the Problem

An optical communication apparatus in an embodiment of the present invention is an optical communication apparatus configured to convert a client signal supplied from a client communication apparatus into an optical signal suitable for transferring over an optical network, and to convert a received optical signal into a client signal, including:
a distribution unit configured to distribute the client signal that is supplied to a plurality of client signals according to destinations and a communication capacity of each destination;
an electrical/optical conversion unit configured to convert the distributed client signals to a plurality of optical signals having different center optical frequencies;
a wavelength division multiplexing unit configured to wavelength division multiplex the plurality of optical signals to output the plurality of optical signals;
a unit configured to demultiplex a plurality of wavelength division multiplexed optical signals that are wavelength division multiplexed for each wavelength;
an optical/electrical conversion unit configured to convert the demultiplexes optical signals into electrical signals; and
a multiplexing output unit configured to multiplex the plurality of electrical signals converted by the optical/electrical conversion unit, and to output the multiplexed electrical signal as a client signal without conversion or after converting the multiplexed electrical signal to an optical signal.

Also, an optical route switching apparatus in an embodiment of the present invention is an optical route switching apparatus including a function for multiplexing, demultiplexing, adding, dropping, and switching a wavelength division multiplexed signal, wherein
an add/drop port includes an input/output port to the optical communication apparatus, and an optical frequency bandwidth for multiplexing, demultiplexing, adding, dropping, and switching is variable according to an optical spectrum width of the optical signal.

Further, a network in an embodiment of the present invention is a network which includes an optical wavelength division multiplexing network in which a plurality of the optical route switching apparatuses are connected by a plurality of optical fibers, and a plurality of client communication apparatuses, wherein the client communication apparatuses are connected via an optical communication apparatus provided in an add/drop port of the optical route switch apparatus, and wherein arbitrary client communication apparatuses communicate with each other by a wavelength path,
wherein an input/output port of the client communication apparatus includes a unit configured to provide a client signal with an information for identifying a destination, and
an input/output port of an arbitrary client communication apparatus is connected to the input/output port of a plurality of arbitrary client communication apparatuses via the optical communication apparatus.

Effect of the Present Invention

According to the optical communication apparatus of an embodiment of the present invention, a function is provided for converting client signals into a plurality of optical signals of different center optical frequencies according to destinations and a communication capacity of each destination, and outputting the optical signals by wavelength division multiplexing the optical signals, which cannot be realized by the conventional technique. Accordingly, when a communication amount of a client signal to the same destination point increases, the arrangement of the center optical frequency of the optical signal for carrying the increased traffic can be set freely, so that it becomes possible to reduce blocking due to spectrum collision with existing other optical signals.

Also, by combining the above-mentioned optical communication apparatus and the optical route switching apparatus, even though there is no free space of optical spectrum in the same route, the effect can be further enhanced by distributing the optical signals for carrying the increased traffic to the other routes having free space.

Further, by setting different center optical frequency according to the destination of the client signal, multiple point connections with other client communication apparatuses can be realized only by connecting the client communication apparatus to the optical wavelength division multiplexing network using one input/output port. The number of connection destinations and the transmission capacity between the connection destinations are adjustable as necessary in the client communication apparatus side. Accordingly, the client communication apparatus such as a router is connected to the optical wavelength division multiplexing network via a requisite minimum number of ports and the optical transmission apparatus, and connections between necessary client communication apparatuses are realized via a requisite minimum number of relay client communication apparatuses, so that it becomes possible to largely reduce apparatus cost, operation cost and consumed power in the whole network.

EMBODIMENTS FOR CARRYING OUT THE INVENTION

In the following, embodiments of the present invention are described with reference to figures.

First Embodiment

Figure 4:
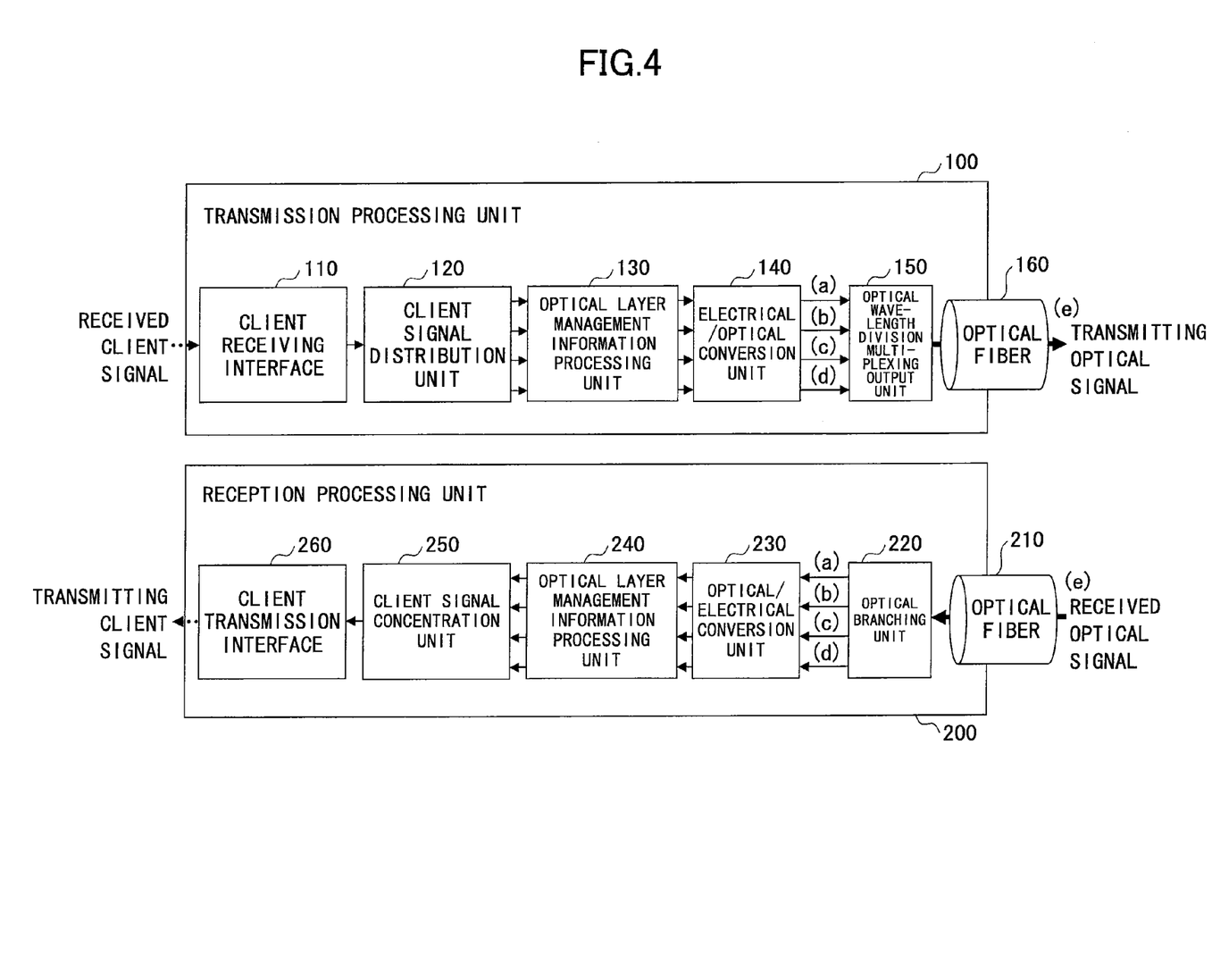
FIG. 4 is a block diagram of basic functions of an optical communication apparatus in a first embodiment of the present invention.
Figure 5:
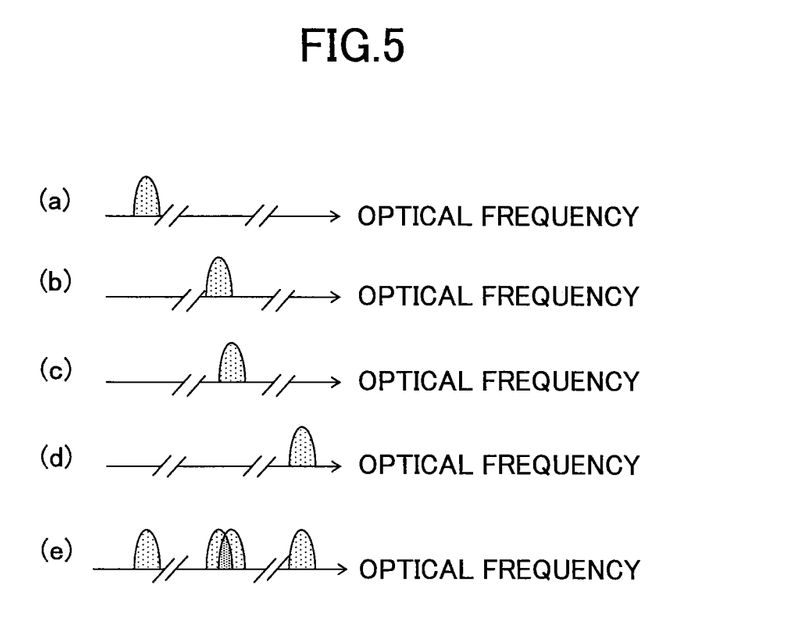
FIG. 5 is a diagram showing an example of optical signal frequency arrangement in the optical communication apparatus.

FIG. 4 is a diagram for describing a basic function block of an optical communication apparatus in the first embodiment of the present invention, and FIG. 5 shows an example of optical signal frequency arrangement.

The optical communication apparatus in the first embodiment of the present invention shown in FIG. 4 includes a transmission processing unit 100 and a reception processing unit 200.

The transmission processing unit 100 includes a client receiving interface 110 configured to receive a client signal, a client signal distribution unit 120 configured to distribute a client signal to a plurality of signals, an optical layer management information processing unit 130 configured to add management information to a client signal, an electrical/optical conversion unit 140 configured to convert a client signal to an optical signal having enough band for transferring the communication amount and an assigned center optical frequency associated with the route, and an optical wavelength division multiplexing output unit 150 configured to output the converted optical signal by performing wavelength division multiplexing.

The client receiving interface 110 receives the client signal from the client communication apparatus, adjusts a format and the like of the received client signal, and outputs the client signal to the client signal distribution unit 120. The client signal received from the client communication apparatus may be either an electrical signal or an optical signal. Also, the client signal may be a wavelength division multiplexed optical signal in which a plurality of wavelengths are multiplexed. When the received client signal is an optical signal, the client receiving interface 110 convers the optical signal to a electrical signal and outputs the converted signal to the client signal distribution unit 120.

As an example, FIG. 4 shows a situation where a client signal input from the client receiving interface 110 is distributed to four signals by the client signal distribution unit 120. The number of signals to be distributed may be set arbitrarily, and it is not necessary that each communication amount is the same. The client signal distribution unit 120 distributes the input client signals to a plurality of signals according to destinations and a communication capacity for each destination.

In the optical layer management information processing unit 130, management information (including error correction information) used in OTN (Optical Transport Network) that is defined in ITU-T G.709, for example, is added to each client signal distributed by the client signal distribution unit 120. After that, the electrical/optical conversion unit 140 convers the client signal into an optical signal having a center optical frequency designated by a network accommodation designing apparatus (not shown in the figure). Generally, a communication amount and a transfer distance are different for each distributed client signal. Thus, in the conversion into the optical signal, a proper baud rate, a proper number of multilevel (bit per symbol), a proper number of carriers, a proper modulation format, and a proper polarization division multiplexing scheme are selected according to the communication capacity and the transfer distance necessary for transferring each optical signal such that the occupied spectrum width becomes the requisite minimum. As to each of the optical layer management information processing unit 130 and the electrical/optical conversion unit 140, it is not necessary that the apparatus is one apparatus, and the apparatus may be a plurality of apparatuses for each distribution unit (four apparatuses in the case of FIG. 4). By providing one apparatus for each of the optical layer management information processing unit 130 and the electrical/optical conversion unit 140 as shown in FIG. 4, there are advantages of cost reduction, reduction of maintenance work amount, for example.

In order to keep necessary transmission amount of the optical signal, a plurality of carriers may be used. In this case, each carrier may be arranged being adjacent with each other on the optical frequency axis, or may be arranged in a distributed manner. In a case where a plurality of carriers are arranged adjacently, a modulation format, like OFDM (Orthogonal Frequency Division Multiplexing), that permits overlapping of spectrums between adjacent carriers can be used. Also, like a Nyquist WDM scheme, even when overlapping of spectrums between carriers are not allowed, if the optical node apparatus through which the optical signal passes is a bandwidth variable ROADM/WXC as described in the non-patent document 1, these carriers are filtered collectively without separation between carriers, thus, affection of filtering clipping effect between carriers can be neglected. As a result, the intervals between adjacent carriers may be arranged to be small to a limit such that spectrum overlapping does not occur. In this case, since guard band is unnecessary, frequency use efficiency becomes high.

In a case where transmission distances are different even though communication capacities are the same, a modulation format with high modulation level and high frequency use efficiency such as 16-QAM and 64-QAM may be adopted for conversion to an optical signal for a client signal of a shorter transfer distance, and a modulation format with low modulation level and good SNR (Signal-to-Noise Ratio) tolerance such as BPSK (Binary Phase Shift Keying) and QPSK (Quadrature Phase Shift keying) may be adopted for conversion to an optical signal for a client signal of a longer transfer distance. For the same transmission capacity, by adopting a modulation format of high frequency use efficiency, the occupied spectrum width for the generated optical signal becomes narrow.

Each optical signal output from the electrical/optical conversion unit 140 is multiplexed in the optical wavelength division multiplexing output unit 150, and is output from an output optical fiber 160. For the optical wavelength division multiplexing output unit 150, an optical coupler, a wavelength selective switch and the like can be used. In general, occupied optical frequency widths of each optical signal are different according to the amount and transmission distance of client signals carried by the optical signal. In a case where a frequency grid defined in ITU-T is selected in accordance with an optical signal having the maximum occupied optical frequency width, excessive optical spectrum is assigned to an optical signal having a narrow occupied optical frequency width, so that frequency use efficiency becomes bad. In such a case, as explained in the non-patent document 1, a flexible center frequency interval can be adopted in which center frequency interval between adjacent optical signals is reduced to the requisite minimum irrespective of the frequency grid. The center frequency interval is designed such that required transmission quality can be ensured in consideration of the effects of interference between signal spectrums, waveform deterioration due to non-linear optical effect in optical fiber transmission, and narrowing of signal spectrum by the optical filter. Also, as the optical wavelength division multiplexing output unit 150 in such a case, a bandwidth variable filter and a bandwidth variable wavelength selective switch based on spatial light modulator such as an optical coupler and LCoS (Liquid Crystal on Silicon) can be used. Also, as necessary, necessary optical output power can be obtained by arranging an optical amplifier. FIG. 5 shows an example of spectrums in a case where the optical signal is arranged irrespective of the frequency grid. In (e) of FIG. 5, although a part of the spectrum is overlapping, it is assumed that they can be separated by using optical OFDM (Orthogonal Frequency Division Multiplexing).

In a case where it is necessary to distribute the client signal for each destination, as destination identification information, a MAC address, an IP address, a port number, a VLAN tag, a VC (Virtual Container) identification number, an ODU (Optical Channel Data Unit) identification information, other signal identification, or a combination of these can be used.

The reception processing unit of the optical communication apparatus in the first embodiment includes an optical branch unit 220 configured to guide a wavelength division multiplexed input optical signal to an optical/electrical conversion unit 230 of the next stage, the optical/electrical conversion unit 230 configured to convert an optical signal to an electrical signal, an optical layer management information processing unit 240 configured to extract a client signal from the converted signal, a client signal concentration unit 250 configured to concentrate converted client signals of a plurality of series into one electrical signal, and a client signal transmission interface 260 configured to transmit the concentrated client signal to a client communication apparatus. The client signal to be transmitted to the client communication apparatus may be either an optical signal or an electrical signal. When the client signal is an optical signal, the client signal transmission interface 260 converts the electrical signal received from the client signal concentration unit 250 into an optical signal.

As the optical branch unit 220, an optical coupler and a wavelength selective switch can be used. The optical/electrical conversion unit 230 is configured by one or a plurality of digital coherent receivers including a wavelength tunable local oscillation laser. The digital coherent receiver includes functions of demultiplexing of wavelength division multiplexed signal, modulation of multilevel signal, modulation of OFDM signals, separation of polarization division multiplexed signal, dispersion compensation, compensation of waveform deterioration due to non-linear optical effect. In the optical layer management information processing unit 240, management information in optical layer is removed from each electrical signal converted from the optical signal so that the client signal is extracted. The client signals are concentrated into a series of client signals in the client signal concentration unit 250, and the series of the client signals are transmitted to the client communication apparatus from the client signal transmission interface 260. Like the transmission processing unit 100, as to each of the optical/electrical conversion unit 230 and the optical layer management information processing unit 240, it is not necessary that the apparatus is one apparatus, and the apparatus may be a plurality of apparatuses (four apparatuses in the case of FIG. 4).

As mentioned above, in the present embodiment, the transmission processing unit 100 side distributes the client signals according to destinations and communication capacity of each destination, converts (electrical-optical) the distributed signals into optical signals of different center frequencies, and outputs the optical signals by multiplexing the optical signals. Then, the reception processing unit 200 side branches the wavelength division multiplexed optical signal to each wavelength (for each sending source), and multiplexes the branched optical signals and output the multiplexed signal. Accordingly, even though the communication amount of client signals to the same point increases, the signals can be accommodated while reducing blocking due to spectrum collision with existing other optical signals since the center optical frequency can be freely set. Also, it becomes possible that the client communication apparatus can connect to multiple points by using one input/output port by setting different center frequency according to the destination of the client signal.

Second Embodiment

Figure 6:
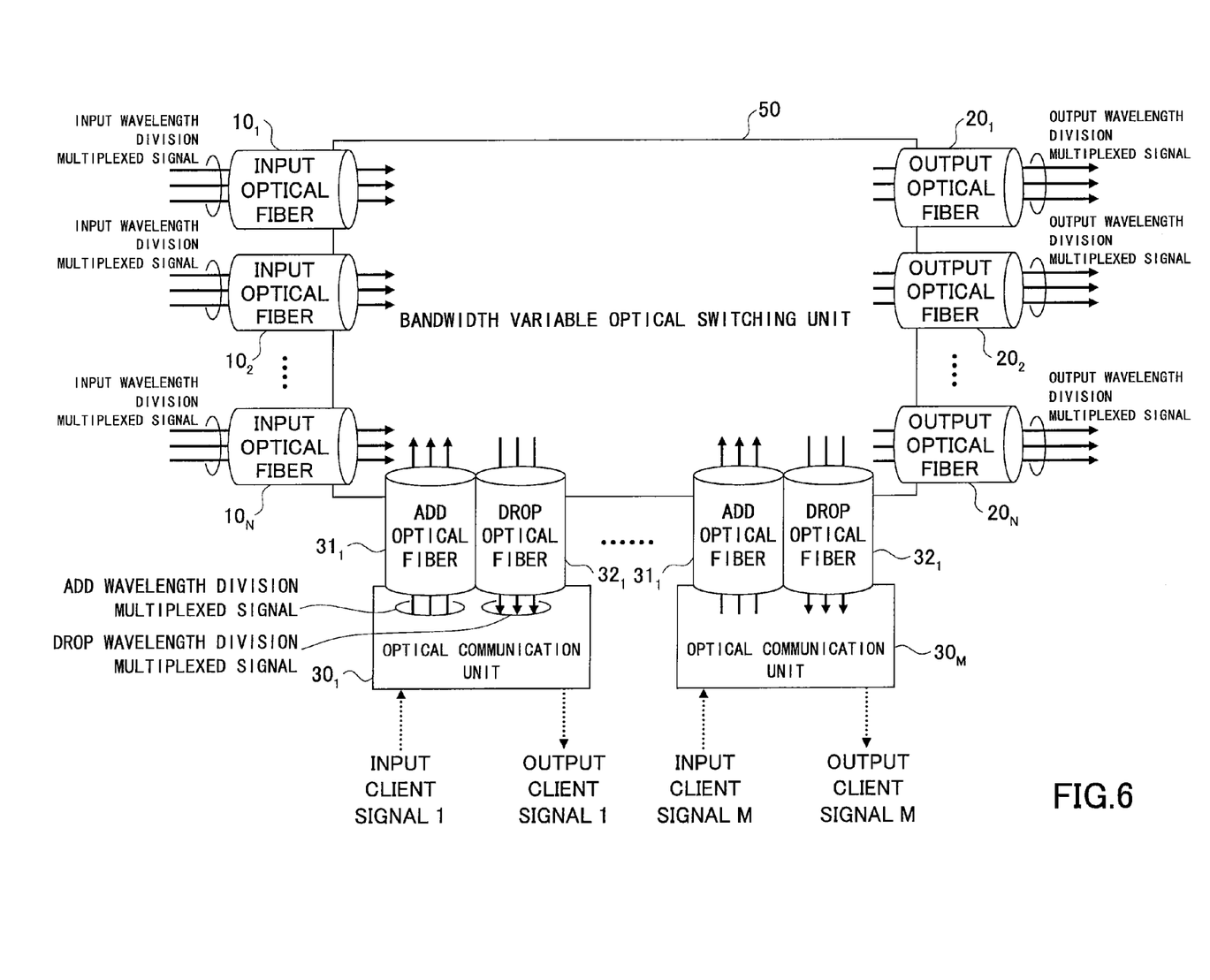
FIG. 6 is a block diagram of basic functions of an optical route switching apparatus in a second embodiment of the present invention.

Next, a configuration of an optical route switching apparatus according to the second embodiment of the present invention is shown in FIG. 6.

In the optical route switching apparatus of the second embodiment of the present invention, in the network side, N input fibers $10_1 \sim 10_N$ and N output fibers $20_1 \sim 20_N$ are connected to the bandwidth variable optical switching unit 50, and in the add/drop side, M optical communication apparatuses $30_1 \sim 30_M$ each including the function of the multiple optical signal output optical communication apparatus shown in the first embodiment are connected to the bandwidth variable optical switching unit 50 via M add fibers $31_1 \sim 31_M$ and M drop fibers $32_1 \sim 32_M$. That is, the add/drop port includes an input/output port to the optical communication apparatus shown in the first embodiment.

A client signal supplied to the optical communication apparatus $30_1 \sim 30_M$ is converted to a plurality of optical signals having different center optical frequency, and after that, the client signal is supplied to the bandwidth variable optical switching unit 50, and is output to an output fiber 20 that is associated with the assigned center frequency and that is predetermined. A wavelength division multiplexed signal supplied from an input fiber 10 is output to an output fiber 20 that is associated with the assigned center frequency and that is predetermined, or is output to a drop fiber 32. Since optical spectrum widths are different between the plurality of optical signals input to the optical communication apparatus 30 or output from the optical communication apparatus 30, the bandwidth variable optical switching unit 50 includes a function that can change a bandwidth of an optical frequency switching window such that an optical frequency switching window of an optimal width can be provided between input and drop fibers and between add and output fibers for each optical signal.

Figure 7:
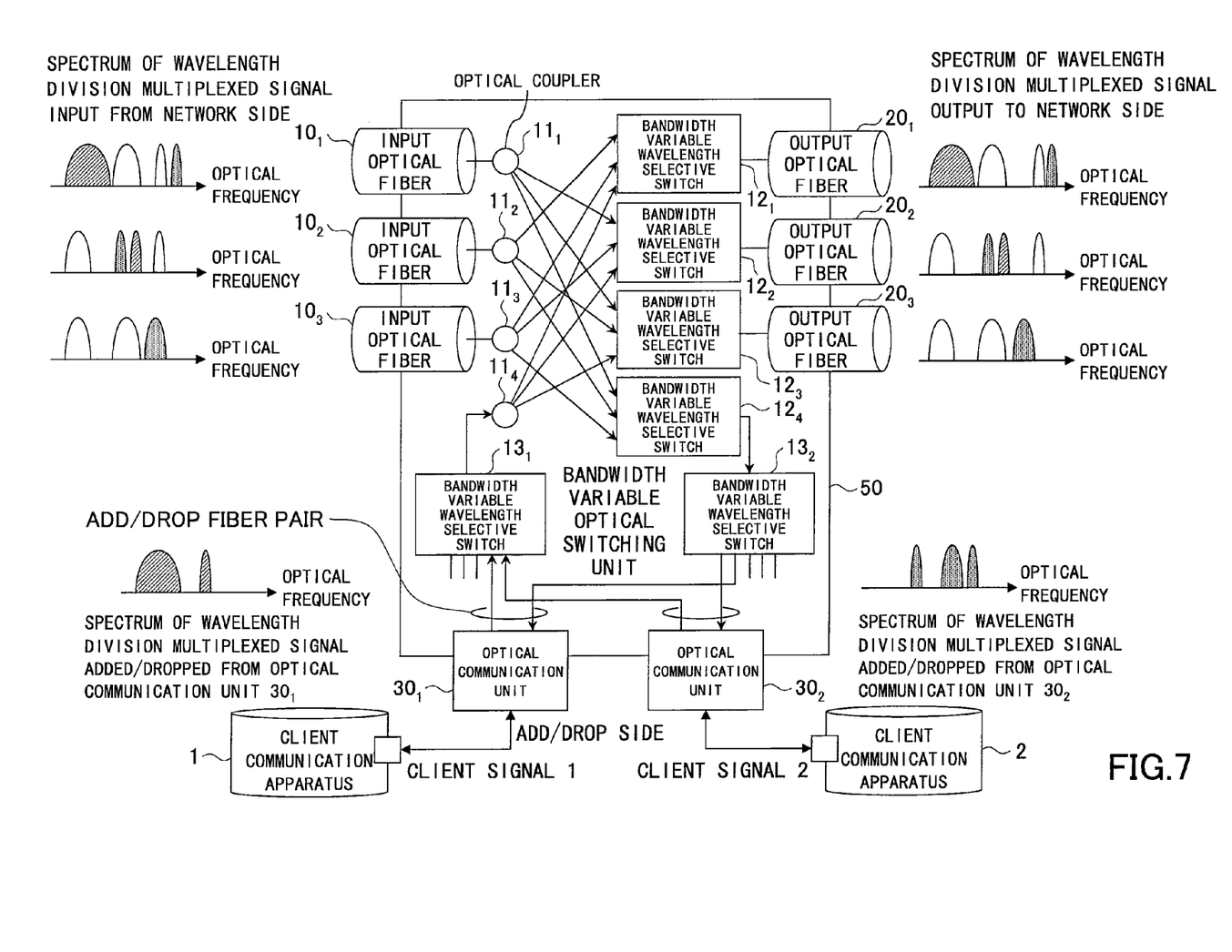
FIG. 7 shows a configuration example of an optical route switching apparatus in the second embodiment of the present invention.

FIG. 7 shows a configuration example of an optical route switching apparatus having such a bandwidth variable switching function. Wavelength division multiplexing is performed by the bandwidth variable wavelength selection switch $13_1$ for the add fibers 31 of the optical communication apparatuses 30, and after that, the signal is distributed to the bandwidth variable wavelength selective switch 12 placed in the output side via an optical coupler 11. The bandwidth variable wavelength selective switch 12 is an optical switch having N input ports and one output port, and the bandwidth variable wavelength selective switch 12 can output an arbitrary optical signal, in a plurality of wavelength division multiplexed optical signals input from an input port, to an output port. Also, the bandwidth variable wavelength selective switch 12 can change an optical frequency width that can be switched. Such a bandwidth variable wavelength selective switch 12 can be realized by combining a spatial light modulator, as shown in a document "G. Baxter et al., "Highly Programmable Wavelength Selective Switch Based on Liquid Crystal on Silicon Switching Elements," Proc. OFC/NFOEC 2006, OTuF2, 2006.", for example, and a diffraction grating.

Therefore, a wavelength selective switch connected to an output fiber 20 can output, to the output fiber 20, only a predetermined optical signal in optical signals supplied from the input fiber 10 and the bandwidth variable wavelength selective switch $13_1$ of the add/drop side.

According to such a function, it becomes possible that a wavelength division multiplexed signal inserted from an optical communication apparatus $30_1$ can be output from a predetermined output fiber 20 according to an assigned center optical frequency. The configuration of the bandwidth variable optical switching unit 50 is not limited to the configuration shown in FIG. 7 as an example. For example, a configuration in which a bandwidth variable function is added to a switch element in a node apparatus configuration described in a document "S. Gringeri, et al., "Flexible Architectures for Optical Transport Nodes and Networks," IEEE Commun. Mag., Vol. 48, Issue. 7, pp. 40-50, 2010.", for example, can be also used as the bandwidth variable optical switching function in the embodiment of the present invention.

Third Embodiment

Next, a configuration of a network according to a third embodiment of the present invention is described. The network of the third embodiment is an example of a network which includes an optical wavelength division multiplexing network in which a plurality of optical route switching apparatuses are connected by a plurality of optical fibers, and a plurality of client communication apparatuses, wherein the client communication apparatus is connected via an optical communications apparatus provided in an add/drop port of the optical route switching apparatus, and wherein arbitrary client apparatuses communicate with each other by a wavelength path.

Figure 8:
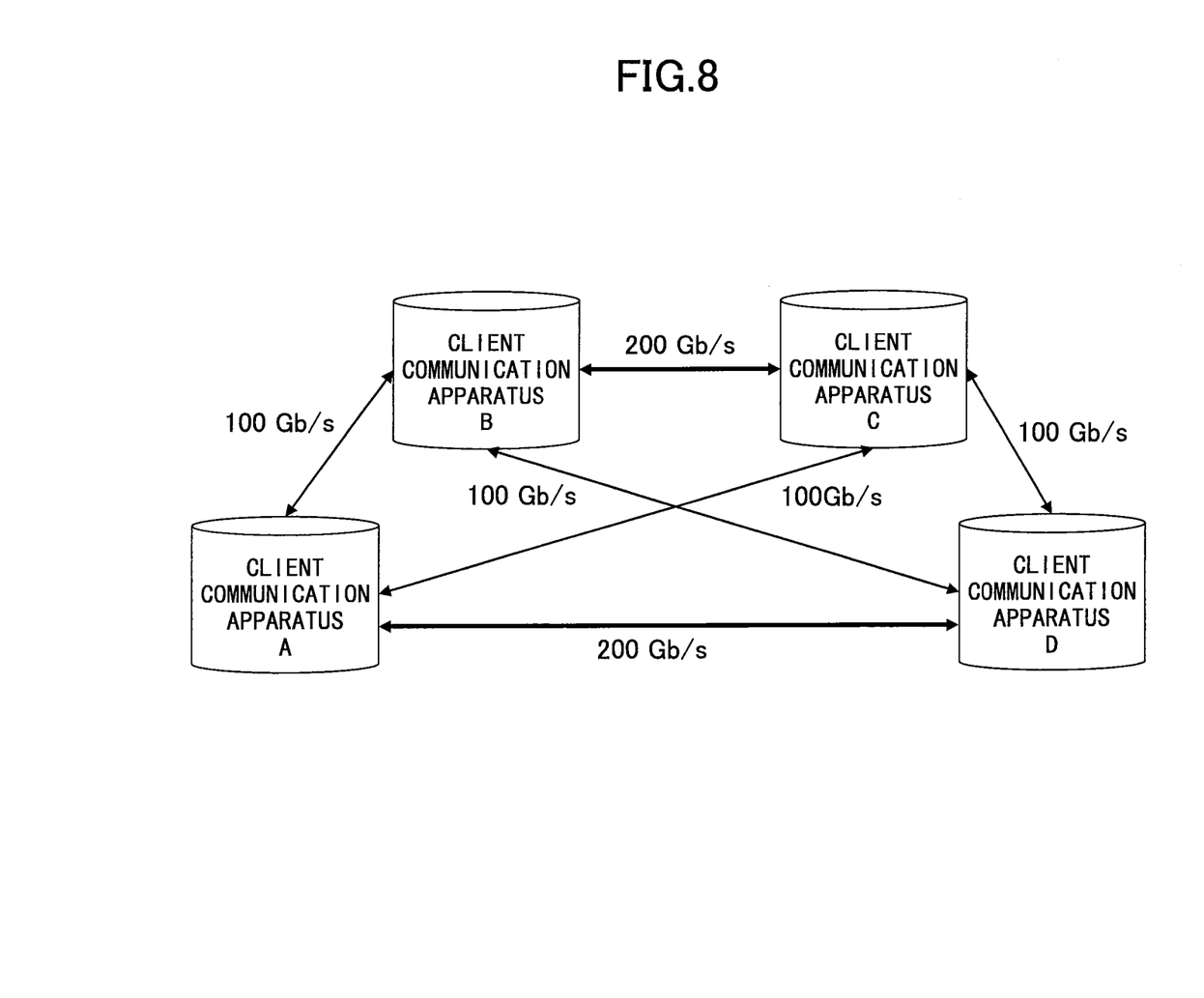
FIG. 8 is a diagram showing communication amounts between client communication apparatuses used as an example in a third embodiment of the present invention.
Figure 9:
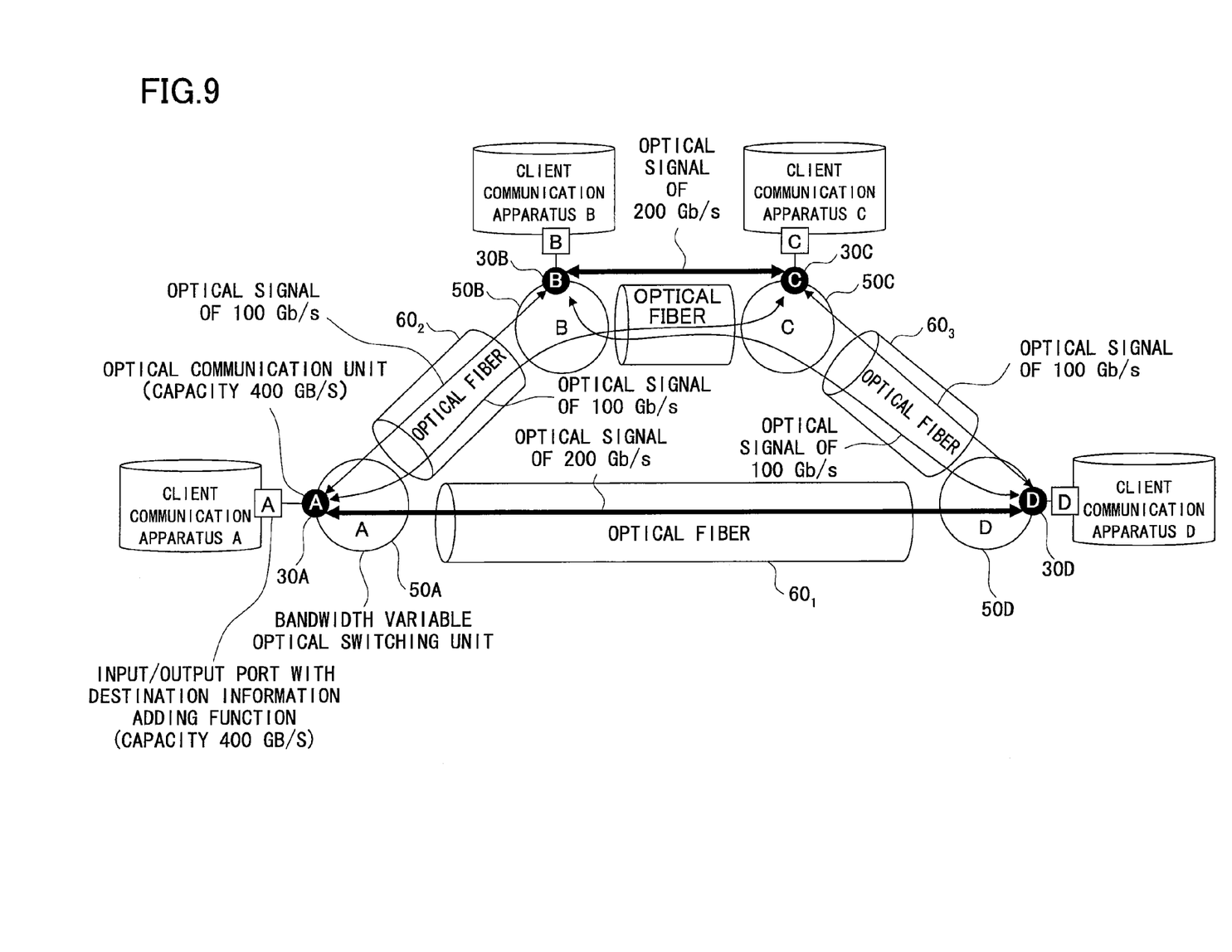
FIG. 9 is a block diagram of a network in the third embodiment of the present invention.

FIG. 8 shows communication amounts between client communication apparatuses assumed as an example. FIG. 9 shows an example in which bandwidth variable optical switching apparatuses 50 each having the multiple optical signal output optical communication apparatus 30 shown in FIG. 1 are connected like a ring by optical fibers 60.

The client communication apparatuses A, B, C, D can communicate with each other by connecting the input/output port and the optical communication apparatus 30. Although the bandwidth variable optical switching units 50 are connected like a ring in the network shown in FIG. 9, the connection configuration of the network of the present invention is not limited to a network like a ring, and can be applied to a network of an arbitrary topology, in which the bandwidth variable optical switching apparatuses may be connected like a straight like, like a mesh, or like a form of a combination of the straight line, the ring and the mesh.

Also, although one optical fiber 60 is shown between optical route switching apparatuses in the figure for the sake of simplicity, a pair of up and down optical fibers exist. Also, as to optical signals, a pair of up and down optical signals are drawn in a simplified manner by using a line with arrows of both ends.

The input/output port of the client communication apparatus A, B, C, D includes a unit configured to provide a client signal with information for identifying a destination.

In the following, description is given by using the client communication apparatus A as an example.

The input/output port of the client communication apparatus A outputs a client signal 100 Gb/s to the client communication apparatus B, a client signal 100 Gb/s to the client communication apparatus C, and a client signal 200 Gb/s to the client communication apparatus D. The optical communication apparatus 30A for which the bandwidth variable optical switching unit 50A is implemented distributes the client signal for each destination, and adds management information, and after that, the client signal is converted to an optical signal that has a designated center optical frequency and that has a proper baud rate, a proper number of multilevel, and a proper number of carries according to a communication capacity and a transmission distance necessary for transferring the client signal, then, the optical signals are wavelength division multiplexed and supplied to the bandwidth variable optical switching unit 50A. In the bandwidth variable optical switching unit 50A, each optical signal is output to an output optical fiber according to the provided center optical frequency. The optical signal transmitted from the optical communication apparatus A to C is not processed in the client communication apparatus B, but is switched by the bandwidth variable optical switching unit 50B, so that the optical signal reaches the bandwidth variable optical switching unit 50C. Therefore, processing load of the client communication apparatus B does not increase.

Also, according to the present invention, each of the number of client communication apparatus interfaces and the number of the optical communication apparatuses can be made one or can be made to be the minimum, so that low cost and low power consumption become possible.

The present invention is not limited to the specifically disclosed embodiments, and variations and modifications may be made without departing from the scope of the claims.

The present international application claims priority based on Japanese patent application No. 2011-099830 filed on Apr. 27, 2011, and the entire contents of the application No. 2011-099830 are incorporated herein by reference.

DESCRIPTION OF REFERENCE SIGNS 10 input optical fiber
20 output optical fiber
30 optical communication apparatus
31 add optical fiber
32 drop optical fiber
50 bandwidth variable optical switching unit
60 optical fiber
100 transmission processing unit
110 client receiving interface
120 client signal distribution unit
130 optical layer management information processing unit
140 electrical/optical conversion unit
150 optical wavelength division multiplexing output unit
160 optical fiber
200 reception processing unit
210 optical fiber
220 optical branch unit
230 optical/electrical conversion unit
240 optical layer management information processing unit
250 client signal concentration unit
260 client transmission interface

The invention claimed is:

1. An optical communication apparatus configured to convert a client signal supplied from a client communication apparatus into an optical signal suitable for transferring over an optical network, and to convert a received optical signal into a client signal, comprising:
  circuitry configured to:
  distribute the client signal that is supplied to a plurality of signals over an optical frequency domain, based on identifiers of destinations added to the client signal, and a communication capacity of each of the destinations, wherein the client signal includes a plurality of multiplexed signals addressed respectively to the plurality of destinations, each of the plurality of multiplexed signals is provided with a respective one of the identifiers which is different for each one of the destinations;
  convert the distributed signals to a plurality of optical signals having different assigned center optical frequencies according to the destinations and the communication capacity of each of the destinations, each of the plurality of optical signals being output to a different output fiber that is associated with the assigned center optical frequency;
  wavelength division multiplex the plurality of optical signals and to output the plurality of optical signals;
  demultiplex a plurality of wavelength division multiplexed optical signals that are wavelength division multiplexed for each of a plurality of wavelengths;
  convert the demultiplexed optical signals into electrical signals; and
  multiplex the electrical signals, and to output the multiplexed electrical signals as a client signal without conversion or after converting the multiplexed electrical signal to an optical signal.

2. The optical communication apparatus as claimed in claim 1, wherein the circuitry is configured to select a modulation format such that an occupied spectrum width of a requisite minimum spectrum width is obtained according to a distance and a communication capacity by which the optical signal should be transmitted.

3. An optical route switching apparatus including a function for multiplexing, demultiplexing, adding, dropping, and switching a wavelength division multiplexed signal, wherein
  an add/drop port includes an input/output port to the optical communication apparatus as claimed in claim 1, and an optical frequency bandwidth for multiplexing, demultiplexing, adding, dropping, and switching is variable according to an optical spectrum width of the optical signal.

4. A system which includes an optical wavelength division multiplexing network in which a plurality of optical route switching apparatuses are connected by a plurality of optical fibers, and a plurality of client communication apparatuses, wherein the client communication apparatuses are connected via an optical communication apparatus provided in an add/drop port of the optical route switch apparatus, and wherein arbitrary client communication apparatuses communicate with each other by a wavelength path,
  wherein an input/output port of the client communication apparatus includes circuitry configured to provide a client signal with information for identifying a destination, and
  at least one of the optical route switching apparatuses is the apparatus as claimed in claim 3, and an input/output port of an arbitrary client communication apparatus is connected to the input/output port of a plurality of arbitrary client communication apparatuses via the optical communication apparatus connected to the add/drop port of the at least one of the optical route switching apparatuses.

5. A method, implemented by an optical communication apparatus configured to convert a client signal supplied from a client communication apparatus into an optical signal suitable for transferring over an optical network, and to convert a received optical signal into a client signal, the method comprising:
  distributing the client signal that is supplied to a plurality of signals over an optical frequency domain, based on identifiers of destinations added to the client signal, and a communication capacity of each of the destinations, wherein the client signal includes a plurality of multiplexed signals addressed respectively to the plurality of destinations, each of the plurality of multiplexed signals is provided with a respective one of the identifiers which is different for each one of the destinations;
  converting the distributed signals to a plurality of optical signals having different assigned center optical frequencies according to the destinations and the communication capacity of each of the destinations, each of the plurality of optical signals being output to a different output fiber that is associated with the assigned center optical frequency;
  wavelength division multiplexing the plurality of optical signals and outputting the plurality of optical signals;
  demultiplexing a plurality of wavelength division multiplexed optical signals that are wavelength division multiplexed for each of a plurality of wavelengths;
  converting the demultiplexed optical signals into electrical signals; and
  multiplexing the electrical signals, and outputting the multiplexed electrical signals as a client signal without conversion or after converting the multiplexed electrical signal to an optical signal.

6. The method as claimed in claim 5, further comprising selecting a modulation format such that an occupied spectrum width of a requisite minimum spectrum width is obtained according to a distance and a communication capacity by which the optical signal should be transmitted.

\* \* \* \* \*